(12) United States Patent
Zuccheri et al.

(10) Patent No.: US 6,321,896 B1
(45) Date of Patent: Nov. 27, 2001

(54) METHOD AND DEVICE FOR CUSHIONED STOPPAGE AND ACCOMPANYING OF CONTAINERS ALONG A CONVEYING LINE FOR CONTAINERS

(75) Inventors: Andrea Zuccheri; Marco Vescovi, both of Parma (IT)

(73) Assignee: SIG Simonazzi Beverage S.p.A., Parma (IT)

( * ) Notice: Subject to any disclaimer, the term of this patent is extended or adjusted under 35 U.S.C. 154(b) by 0 days.

(21) Appl. No.: 09/463,047
(22) PCT Filed: May 27, 1998
(86) PCT No.: PCT/IT98/00136
§ 371 Date: Jan. 14, 2000
§ 102(e) Date: Jan. 14, 2000
(87) PCT Pub. No.: WO99/03766
PCT Pub. Date: Jan. 28, 1999

(30) Foreign Application Priority Data

Jul. 18, 1997 (IT) .............................................. PR97A0042

(51) Int. Cl.[7] .................................................. B65G 47/26
(52) U.S. Cl. ..................................... 198/419.1; 198/419.3
(58) Field of Search ............................. 198/419.1, 419.3, 198/429, 459.1, 460.1, 460.3, 577

(56) References Cited

U.S. PATENT DOCUMENTS

| | | |
|---|---|---|
| 3,417,540 * | 12/1968 | Copping et al. ................... 198/419.3 |
| 3,987,889 | 10/1976 | Nieto . |
| 4,522,294 * | 6/1985 | Walz ..................................... 198/429 |
| 4,828,101 * | 5/1989 | Fluck ................................... 198/429 |
| 5,441,382 * | 8/1995 | Mojden et al. .................... 414/798.9 |
| 5,657,615 * | 8/1997 | Muller ............................... 198/419.3 |
| 6,182,814 * | 2/2001 | Koehler ............................. 198/418.7 |

FOREIGN PATENT DOCUMENTS

| | | |
|---|---|---|
| 3622980 | 1/1987 | (DE) . |
| 3015203 | 10/1987 | (DE) . |
| 8907573 | 8/1989 | (DE) . |
| 2090804 | 7/1982 | (GB) . |

\* cited by examiner

*Primary Examiner*—Christopher P. Ellis
*Assistant Examiner*—Khoi H. Tran

(57) ABSTRACT

A method for processing containers involves: detection of the conveying, speed of the containers so as to synchronize cushioned stoppage and accompanying device with said speed; detection of an interstice between consecutive containers and insertion of said device in said interstice; gradual, controlled and programmable, stoppage of the some of the containers in a predetermined space and simultaneous accompanying of the containers downstream of the stoppage zone, at the conveying speed of the conveying line. The cushioned stoppage device comprise a linear motor (1a) movable in a direction parallel to that of conveying of the containers (2) and provided with a stopping member (8) which is displaced in a direction perpendicular to that of the containers (2) so as to be inserted between two consecutive containers (2).

The apparatus also comprises accompanying device (9) associated with the cushioned stoppage device mounted slidably with respect thereto in a direction parallel to that of conveying of the containers (2) and at the same speed as them.

10 Claims, 4 Drawing Sheets

METHOD AND DEVICE FOR CUSHIONED STOPPAGE AND ACCOMPANYING OF CONTAINERS ALONG A CONVEYING LINE FOR CONTAINERS

BACKGROUND OF THE INVENTION

The present invention relates to a method and a device for cushioned stoppage and accompanying of containers along a conveying line for containers. The method and the device are applied to containers or similar objects transported or conveyed to the feeding group of machine intended for processing thereof. When a row of bottles, or other types of fragile containers, transported on a conveying or feeding system of the known type stops, there is the risk that the said containers may be damaged owing to the effect of the sudden deceleration.

This is all the more true the greater the speed of the containers and the smaller the stoppage space.

Moreover, by intervening in some way from the outside in order to stop the line of containers, there is the risk that the remainder of the containers not stopped, i.e. those located between the intervention zone and the feeding zone of the machine situated downstream, will fall along the conveying line as a result of the sudden lack of pressure normally exerted by the row of containers situated behind.

The lack of a sufficient thrusting force or pressure may also prevent the entry of the containers into the feeding device of the machine situated downstream. The stopping devices of the known type are generally positioned slightly before the machine entry point and are activated in the case of sudden stoppages of said machine so as to prevent it from continuing to be fed with the containers.

The stopping devices thus allow stoppage of the machine or the entry conveyor to be avoided.

The stopping devices must allow gradual slowing down of the containers (so as to avoid breakage and damage) and must at the same time prevent some containers from going beyond the stopping device.

DE-A-3015203 discloses a stopping device which uses a rotating star wheel which always interferes with the containers and is mounted on a support which is able to translate parallel to the direction of conveying of the containers along a section limited by eyelets, being moved by the rod of a first pneumatic cylinder which acts as a cushioning member. The rod of a second pneumatic cylinder, mounted on the support, locks the rotation of the star wheel, which therefore acts a member for stopping the containers. After locking of the star wheel, the support is pushed by the pressure exerted by the row of containers which is kept in equilibrium by the cushioning member. A first drawback arises from the fact that when the shape or size of the containers changes, the star wheel must be changed.

Moreover the abovementioned device is unable to prevent falling of the last container which is not stopped and which continues towards the machine downstream without any support behind.

A further drawback consists in the high level of noise produced by the star wheel which always interferes with the containers and is made to rotate by the feeding movement of said containers.

DE 3622980 discloses a device similar to the preceding device in which the cushioning member moves a carriage which supports the stopping member. In this case the stopping member consists of a segment actuated by a lever mechanism moved by the rod of a pneumatic cylinder.

In this case the noise level is reduced and the stopping member probably does not have to be changed when there is a change in the shape or size of the containers, but in any case there still remains the problem of falling of the last container which is not stopped and moreover the mechanism described in the aforementioned document is somewhat complex.

Moreover, during activation of the se gent and its introduction into the path of the containers, it is possible that the containers may be compressed and damaged. Both the documents described above have the drawback that they require the use of two pneumatic cylinders one for cushioning and one for activation of the stop element. Moreover the cylinder situated on the carriage must be provided with flexible guides which may be easily damaged.

DE-A-3740014 discloses a stopping device which proposes eliminating some of the aforementioned drawbacks by means of use of a cushioning cylinder which moves an actuating element between an enabled upstream conveying position and blocked downstream conveying position.

The actuating element supports the stopping element and regulates the activation thereof by means of its movement between the two positions described above. In this case also, however, the last container of the containers which are not stopped tends to fall since it does not have any rear support.

GB 2090804 discloses a grouping apparatus for articles to be packaged, which uses fingers driven at different speeds to cause gaps between group of bottles on a conveyor belt. However the leverism which moves the fingers is rather complex and inadequate for conveyor belt travelling at high speeds.

SUMMARY OF THE INVENTION

The object of the present invention is to eliminate the aforementioned drawbacks and provide a method and a stopping device which allow more gradual and delicate stopping of the containers, preventing damage thereto. A further object is that of allowing improved adjustment of the operation of the device itself, making it efficient irrespective of the braking space, the speed of the containers, their geometrical shape, mass and specific resistance.

Another object is that of allowing application to conveyors which have high speeds, for example greater than 50,000 containers/hour.

Another object is that of preventing falling of the containers which are not stopped, ensuring that they are accompanied.

These and other: characteristic features will emerge more clearly from the following description of a preferred embodiment illustrated, purely by way of a non-limiting, example, in the accompanying, illustrative plates,

DETAILED DESCRIPTION

Figure 1:
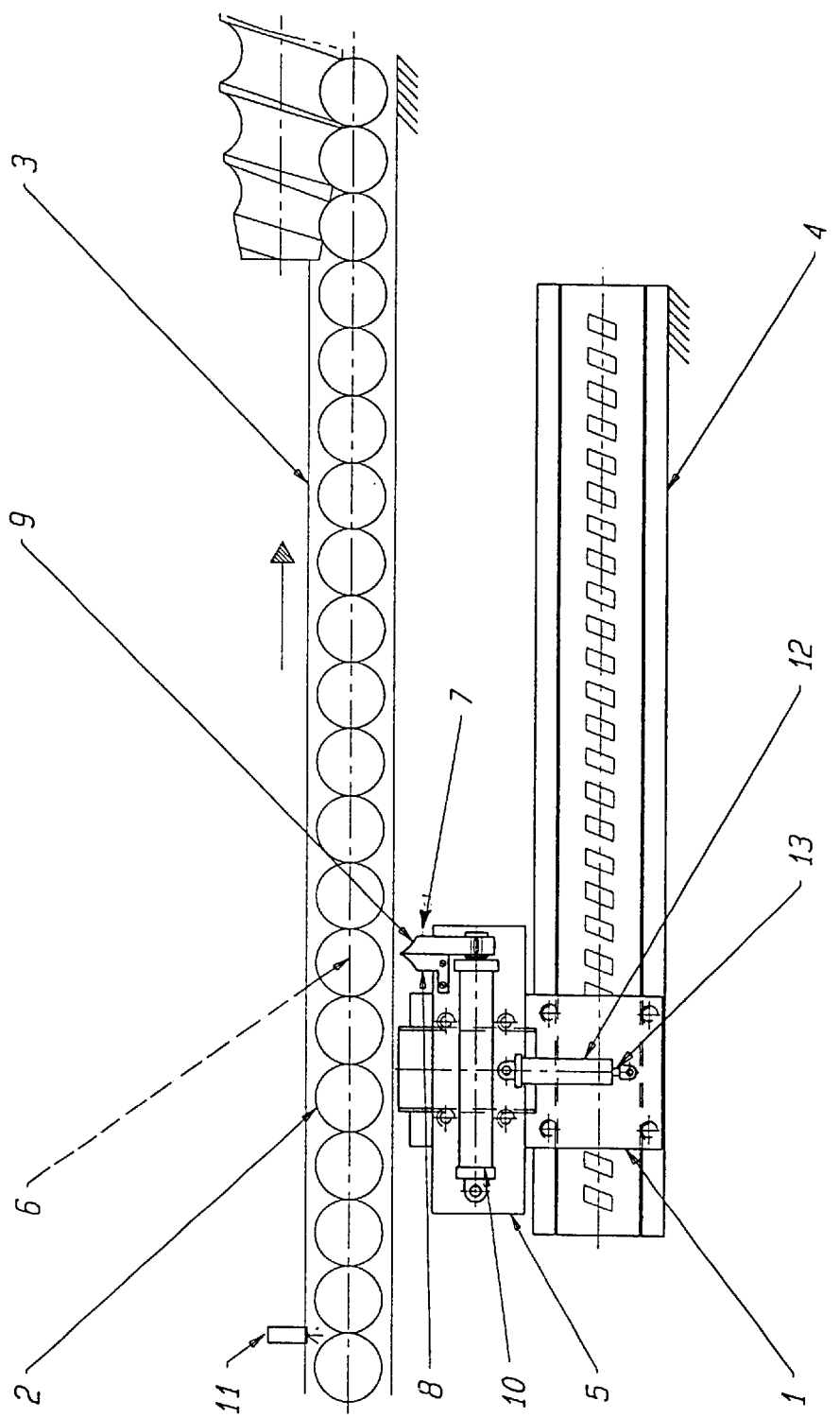
FIGS. 1, 2 and 3 shoes a plan view of the present device, respectively in the rest position, active stopping position, and stopping and accompanying position.

With reference to the Figures, 1 denotes in its entirety an original linear unit mounted parallel alongside a conveyor 3 of containers 2 and provided with a programmable logic control unit (or PLC), not illustrated, which, depending on the conveying speed, allows the linear unit 1 to reach, within a short space (about 5–30 cm), the speed of synchronization of the containers 2

The linear unit 1 consists of a linear motor or movable part 1a which moves on a fixed support platform 4, secured to a fixed frame at the machine entry point.

The linear unit 1 is provided with a movable slide 5 or cross-slide which moves in a direction perpendicular to the conveying direction indicated by the axis 6 of the conveyor, actuated by a rod 13 of a pneumatic cylinder 12, so as to cause a stopping means or member 7 to interfere with the containers 2.

The pneumatic cylinder 12 is secured to the cross-slide 5, while its rod 13 is secured to the movable part 1a, by means of a pin 20.

The pneumatic cylinder 12 and its rod 13 form actuator means. The cross-slide 5, during its movement, travels on a guide 14 by means of small rollers 15.

The stopping member 7 comprises two adjacent wedges 8 and 9, one of which, the wedge 8, is secured to the cross-slide 5 and acts as an actual stopping member, while the other one, the wedge 9, is mounted on a rod 16 of a second pneumatic cylinder 10 (which performs the functions of a longitudinal slide) having a direction parallel to the direction of feeding of the containers on the conveyor 3.

The second wedge 9 therefore moves in a direction parallel to that of conveying of the containers, being moved by the second pneumatic cylinder 10 fastened to the cross-slide 5.

Figure 2:
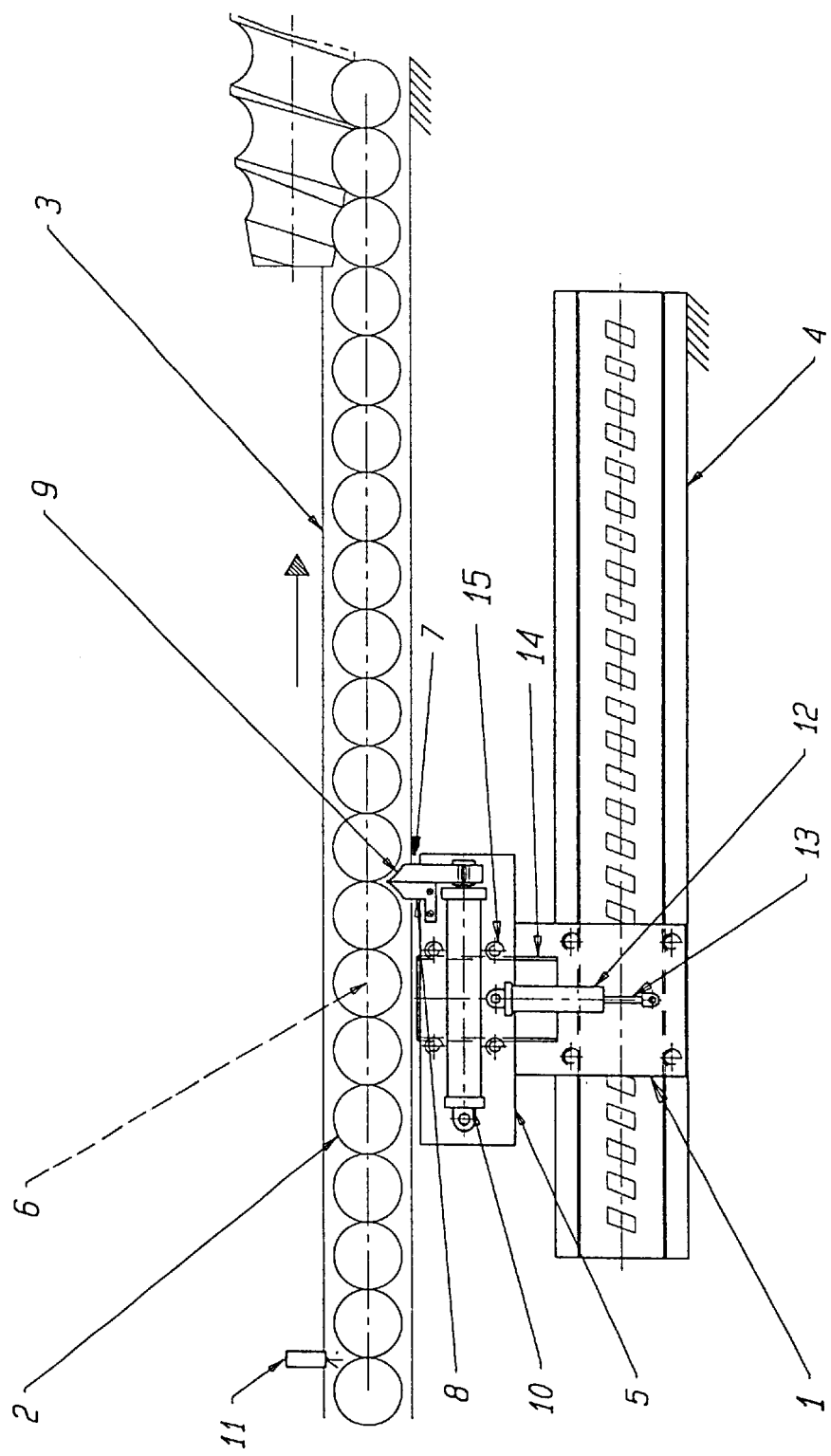

The wedges 8 and 9, with operation of the cross-slide 5, are inserted between two adjacent containers, as illustrated in FIG. 2.

This is made possible by the presence of a sensor 11 which is mounted alongside the conveyor upstream of the linear unit and which allows the position of the interstice between two containers to be detected, thereby enabling the movable part 1a of the linear unit 1 to move in synchronism with the interstice itself so as to then actuate the cross-slide which allows the introduction, in a precise manner, of the wedges between the containers, without any damage to the latter.

The term "interstice" is understood as referring essentially to the line of demarcation between one container and the next one, also in the case where these are arranged against one another and hence without any actual gap between them. Subsequently, the method according to the present invention envisages a step where the containers slow down upstream of the first wedge 8 by means of deceleration of the movable part 1a of the linear unit 1: the containers 2 transmit their thrusting force to the first wedge 8 fixed to the cross-slide supported directly by the movable part 1a of the linear unit 1.

The programmability of the deceleration sequence of the linear unit allows the cushioning to be optimized according to the braking space, the speed of the containers, their geometrical shape and their mass and specific resistance. In a graphic representation in which the distance travelled is located on the abscissa axis and the speed of the containers is located on the ordinate axis, the resultant curve is preferably a hyperbola.

Figure 3:
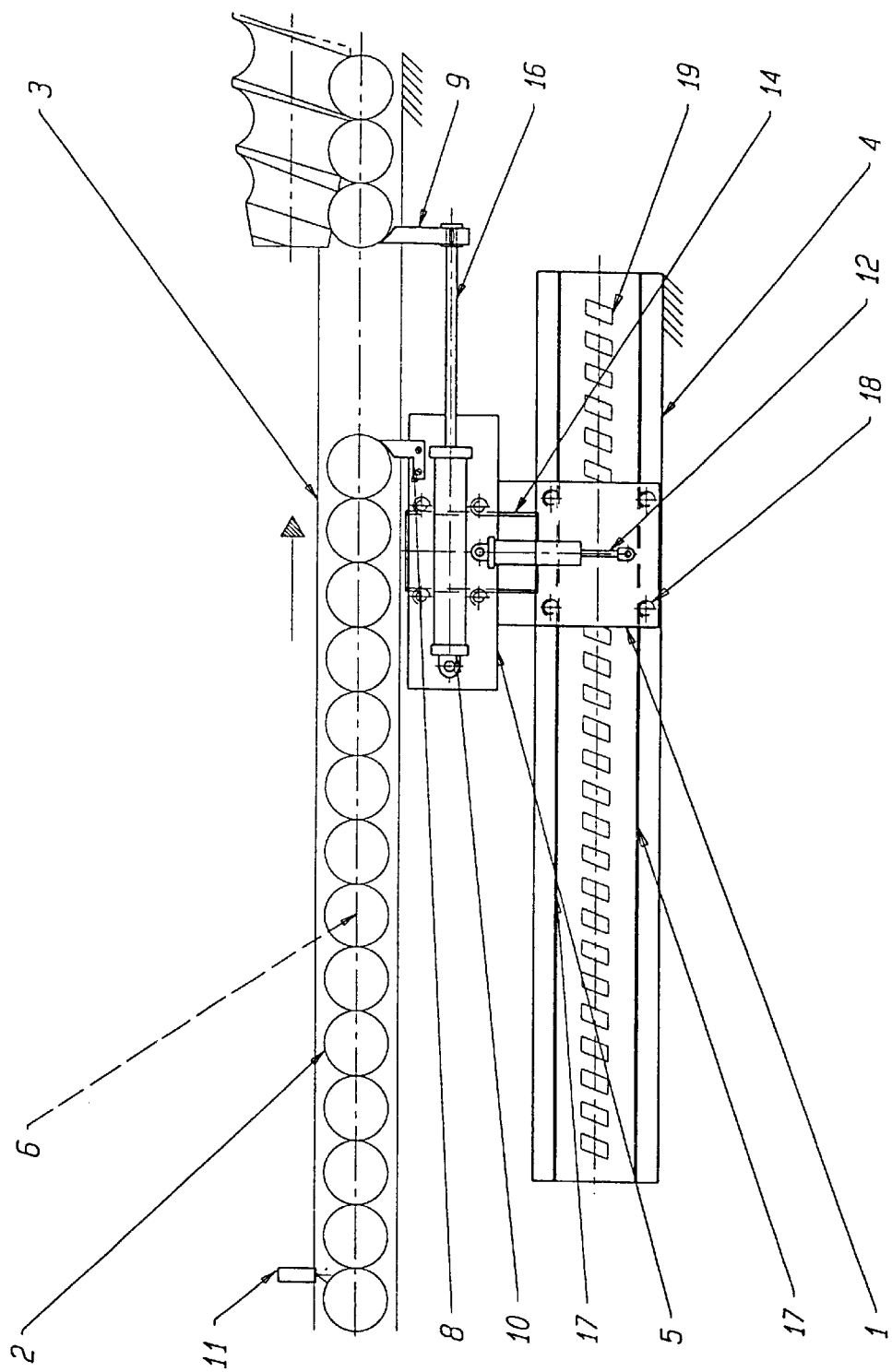
Figure 4:
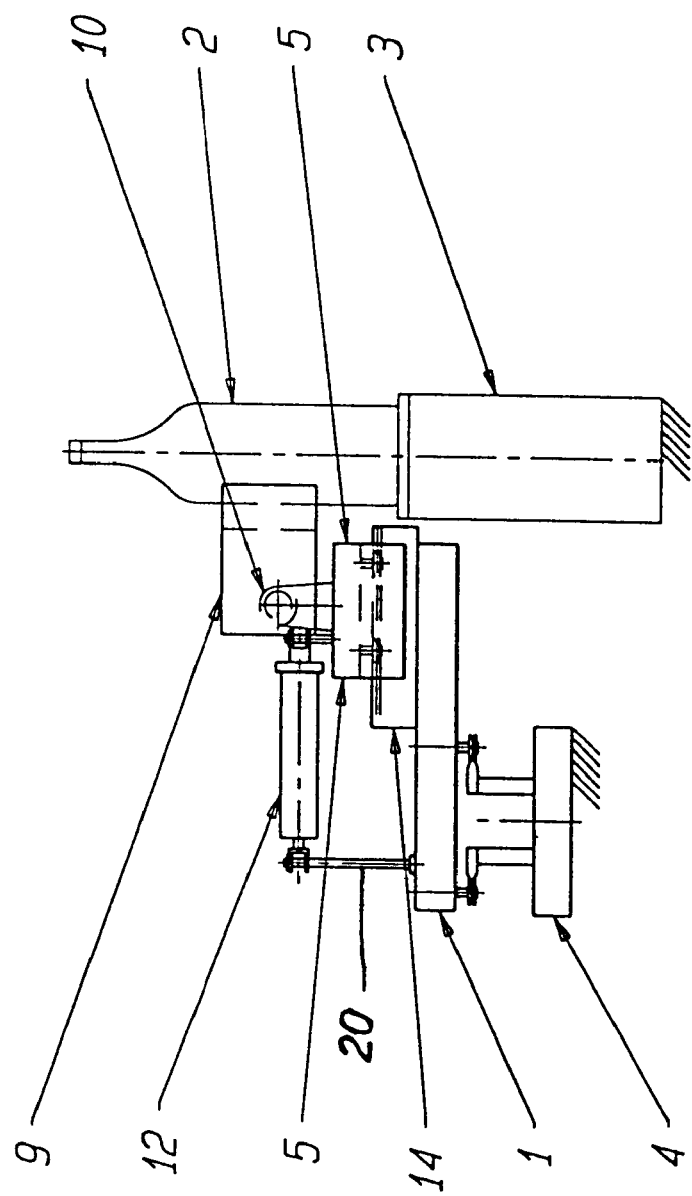
FIG. 4 shows a side view of the device.

When the linear unit, which acts as a cushioning means, starts to slow down, the containers 2 situated between the second wedge 9 and the feeding point of the machine downstream continue to advance at the same speed as the conveyor 3, moving away gradually from the rest of the row which is slowing down, as illustrated in FIG. 3. During this step, the second wedge 9, pushed by its actuator (i.e. by the rod 16 of the second pneumatic cylinder 10), accompanies the containers to the entry point of the machine downstream of the conveyor, providing them with rear support, i.e. simulating the presence of other containers situated behind. In this way, instability and falling of the containers is avoided owing to lack of rear support.

While the shaped wedge 8 acts as a proper stopping means, the shaped wedge 9 acts as a means for accompanying the containers 2.

The method and the device forming the subject of the present invention therefore allow the containers upstream of the device to be stopped in a reliable and gentle manner and the containers downstream, which are not stopped, to be accompanied at the same time, so as to prevent falling thereof.

This is achieved in an extremely simple manner with a linear motor movable parallel to the container conveying line (having the advantage that it is programmable and therefore can be adapted to all situations) and provided with a slide movable transversely with respect thereto and equipped with a pair of wedges, one of which (the fixed one) acts as an element for stopping the containers, while the other one (movable in the same direction as the linear unit, but at a different speed) acts as a rear support for the row of containers which, not stopped, are fed towards the machine downstream.

The linear motor travels on a guide 17 of the platform 4 by means of idle rollers 18. Permanent magnets, indicated schematically by 19, are associated with the platform 4, while the windings of the motor are associated with the movable part 1.

By modulating the current which passes through the windings it is possible to control the steps of feeding and slowing down of the linear unit according to the requirements. As a result of the original use of a linear motor as the cushioning means, it is possible to program the deceleration sequence or ramp, optimizing it according to the individual applications and making the best possible use of the braking space available, with a deceleration which is normally higher during the first stage and decreasing in the vicinity of actual stoppage of the containers. With the devices of the known art, based on the use of pneumatic or hydraulic cylinders, this is not possible, since in them the force of the rod is constant and depends on the pressure supplied.

The linear unit 1, which essentially consists of a fixed part (the platform 4 with the magnets 19) and a movable part 1, forms a cushioning means which acts at the same time as a support for the stopping means (the stopping member mounted on the cross-slide 5 actuated by the pneumatic cylinder 12, the rod 13 of which is fastened to the movable part 1a of the linear unit 1, forming therewith cushioned stoppage means.

What is claimed is:

1. Method for cushioned stoppage and accompanying of containers, along a container conveying line which conveys more than 50,000 containers/hour, comprising the following steps:

detection of the conveying speed of the containers so as to synchronize means for cushioned stoppage and accompanying of the containers with this speed;

gradual, controlled and programmable, stoppage of some of the containers in a predetermined space, characterized in that it further comprises the following steps:

detection of an interstice or line of demarcation between consecutive containers and insertion of the cushioned stoppage and accompanying means in said interstice or line of demarcation;

accompanying, by means of rear support, of the row of containers downstream of a stopping zone, at a speed equal to the conveying speed of the containers on the conveying line, simultaneously to the step of gradual stoppage.

2. Method according to claim 1, in which the step involving gradual stoppage of the containers occurs with a deceleration which decreases gradually approaching the zone of final stoppage of the containers, so as to allow a gentle stopping action.

3. Method according to claim 1, wherein the means for cushioned stoppage and accompanying of the containers are synchronized with the conveying speed of the containers within 0.05–0.30 m from the detection of the conveying speed.

4. Device for cushioned stoppage and accompanying of containers, along a container conveying line, of the type provided with means for cushioned stoppage of the containers comprising a linear unit (1) consisting of a fixed part (4, 19) and a part (5) movable in a direction parallel to that of conveying of the containers (2) and provided with a stopping member (8) formed so as to be displaced in a direction substantially perpendicular to the direction of conveying of the containers (2) so as to be inserted between two consecutive containers (2), characterized in that the device comprises means for detecting an interstice or line of demarcation between consecutive containers such as to insert therein the means for cushioned stoppage of the containers whose movable part (5) of the means for cushioned stoppage carries means for accompanying (9) containers (2) downstream of a stopping zone at the same speed of the conveying line.

5. Device according to claim 4, in which said accompanying means (9) are formed so as to be displaced, with the aid of actuator means (12, 13), also in a direction substantially perpendicular to that of conveying of the containers (2) so as to be inserted between two consecutive containers (2) and then proceed, in the direction of feeding of the containers (2) at the same speed as the containers (2), supporting them at the rear.

6. Device according to claim 4, in which said accompanying means (9) are activated in a direction substantially perpendicular to that of conveying of the containers (2), at the same time as the stopping member (8).

7. Device according to claim 4, in which the stoppage and accompanying means consist of a pair of shaped wedges (8, 9), one (8) of which, designed to stop the containers (2), is fixed to a cross-slide (5) slidable on a guide (14) secured to the cushioning means (1) in a direction perpendicular to that of conveying of the containers (2), and the other (9) of which, designed to accompany the containers which are not stopped, is movable integrally with the rod (6) of a pneumatic cylinder (10) secured to the cross-slide (5).

8. Device according to claim 4, wherein the means for detecting an interstice or line of demarcation comprises a sensor (11) for detecting the position of the interstice or line of demarcation between two consecutive containers, enabling the movable part (5) to move in synchronism with said interstice or line of demarcation.

9. Device according to claim 4, characterized in that the linear unit (1) comprises a linear motor movable parallel to the container conveying line and provided with a slide movable transversely with respect thereto and equipped with a pair of wedges, one of which is fixed to the movable slide and acts as an element for stopping the container, while the other one is movable with respect to the movable slide and acts as rear support for the row of containers which are not stopped.

10. Device according to claim 9, characterized in that it comprises a guide 17 on which the linear motor travels through idle rollers (18), permanent magnets (19) being associated to a fixed platform (4), windings of the motor being associated to a movable part of the motor itself.

* * * * *